(12) United States Patent
Absar et al.

(10) Patent No.: US 9,990,186 B2
(45) Date of Patent: Jun. 5, 2018

(54) DETERMINATION OF BRANCH CONVERGENCE IN A SEQUENCE OF PROGRAM INSTRUCTION

(71) Applicant: ARM LIMITED, Cambridge (GB)

(72) Inventors: Mohammed Javed Absar, Upper Cambourne (GB); Marco Cornero, Cambridge (GB); Georgia Kouveli, Fulbourn (GB); Carl Von Platen, Malmö (SE)

(73) Assignee: ARM Limited, Cambridge (GB)

( * ) Notice: Subject to any disclaimer, the term of this patent is extended or adjusted under 35 U.S.C. 154(b) by 52 days.

(21) Appl. No.: 15/168,368

(22) Filed: May 31, 2016

(65) Prior Publication Data

US 2016/0371067 A1    Dec. 22, 2016

(30) Foreign Application Priority Data

Jun. 18, 2015 (EP) .................................... 15386020

(51) Int. Cl.
*G06F 9/45* (2006.01)

(52) U.S. Cl.
CPC ................ *G06F 8/41* (2013.01); *G06F 8/433* (2013.01); *G06F 8/456* (2013.01); *G06F 8/458* (2013.01); *G06F 8/52* (2013.01)

(58) Field of Classification Search
CPC . G06F 8/41; G06F 8/433; G06F 8/456; G06F 8/458; G06F 8/52
USPC .......................................................... 717/150
See application file for complete search history.

(56) References Cited

U.S. PATENT DOCUMENTS

| 6,026,241 | A  | * | 2/2000  | Chow ..................... G06F 8/443 717/152 |
| 7,827,022 | B2 | * | 11/2010 | Kline, Jr. ............. G05B 19/056 717/126 |
| 8,381,203 | B1 | * | 2/2013  | Beylin .................... G06F 8/458 717/150 |
| 8,782,611 | B1 | * | 7/2014  | Kretzler .............. G06F 11/3632 717/129 |

(Continued)

OTHER PUBLICATIONS

Cui et al. "An Accurate GPU Performance Model for Effective Control Flow Divergence Optimization", 2012, IEEE.*

(Continued)

*Primary Examiner* — Wei Zhen
*Assistant Examiner* — Junchun Wu
(74) *Attorney, Agent, or Firm* — Nixon & Vanderhye P.C.

(57) ABSTRACT

A method of compiling a sequence of program instructions, a method of parallel execution of a sequence of program instructions and apparatuses and software supporting such methods are disclosed. The sequence of program instructions is analyzed in terms of basic blocks forming a control flow graph and execution paths through that control flow graph are identified. When more than one execution path leads to a given basic block, or when a loop path is found leading from a given basic block back to the same basic block, a potential convergence point may be identified. A convergence marker is added to the computer program associated with the basic blocks identified in this way and then when the program is executed, the convergence markers found are used to trigger a determination of a subset of the multiple execution threads which are executed following that convergence marker.

5 Claims, 7 Drawing Sheets

(56) References Cited

U.S. PATENT DOCUMENTS

| | | | | |
|---|---|---|---|---|
| 9,697,003 | B2* | 7/2017 | Howes | G06F 9/3851 |
| 9,830,164 | B2* | 11/2017 | Yazdani | G06F 9/3887 |
| 2006/0048114 | A1* | 3/2006 | Schmidt | G06F 9/45516 717/148 |
| 2006/0179423 | A1* | 8/2006 | Lindwer | G06F 9/30174 717/136 |
| 2009/0037885 | A1* | 2/2009 | Edwards | G06F 11/3688 717/128 |
| 2010/0268447 | A1* | 10/2010 | Griffiths | G01C 21/3423 701/532 |
| 2014/0165049 | A1* | 6/2014 | Diamos | G06F 8/443 717/156 |
| 2014/0215187 | A1* | 7/2014 | Yazdani | G06F 8/445 712/206 |
| 2014/0223420 | A1* | 8/2014 | Kudlur | G06F 8/4451 717/156 |
| 2014/0365752 | A1* | 12/2014 | Howes | G06F 9/3851 712/233 |
| 2014/0380317 | A1* | 12/2014 | Merrill | G06F 7/506 718/100 |
| 2016/0170725 | A1* | 6/2016 | Holton | G06F 8/433 717/157 |

OTHER PUBLICATIONS

Lau et al. "A Loop Correlation Technique to Improve Performance Auditing", 2007, IEEE.*

Fung et al. "Dynamic Warp Formation and Scheduling for Efficient GPU Control Flow", 2007, IEEE.*

Arora, "The Architecture and Evolution of CPU-GPU Systems for General Purpose Computing", 2012, University of California, San Diego.*

Search Report for EP 15386020.0, dated Nov. 27, 2015, 14 pages.

Diamos et al., "SIMD Re-Convergence at Thread Frontiers", Proceedings of the 44$^{th}$ Annual IEEE/ACM International Symposium on Microarchitecture, Dec. 3, 2011, pp. 477-488.

Huo et al., "Efficient Scheduling of Recursive Control Flow on GPU's", Proceedings of the 27$^{th}$ International ACM Conference on International Conference on Supercomputing, Jun. 10, 2013, pp. 409-420.

Frey et al., "SIMT Microscheduling: Reducing Thread Stalling in Divergent Iterative Algorithms", Parallel, Distributed and Network-Based Processing (PDP), 2012 20th Euromicro International Conference on, IEEE, Feb. 15, 2012, pp. 399-406.

Lee et al., "Convergence and Scalarization for Data-Parallel Architectures", Code Generation and Optimization (CGO), 2013 IEEE/ACM International Symposium on IEEE, Feb. 23, 2013, pp. 1-11.

Meng et l., "Dynamic Warp Subdivision for Integrated Branch and Memory Divergence Tolerance", ACM Sigarch Computer Architecture News, ISCA '10, vol. 38, issue 3, Jun. 2010, p. 265-246.

Fung et al., "Dynamic Warp Formation and Scheduling for Efficient GPU Control Flow", Department of Electrical and Computer Engineering, Vancouver BC, 40th Annual IEEE/ACM International Symposium on Microarchitecture (Micro 2007), Dec. 1-5, 2007, pp. 407-420.

* cited by examiner

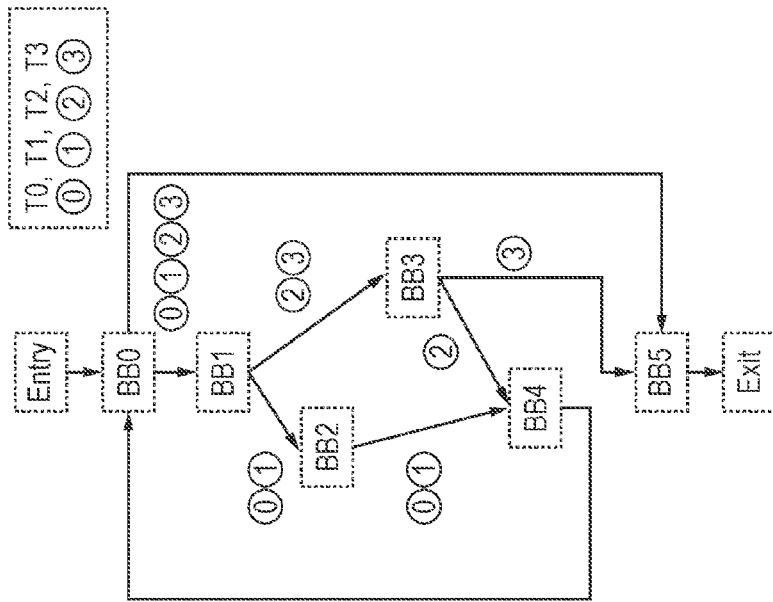
FIG. 3C
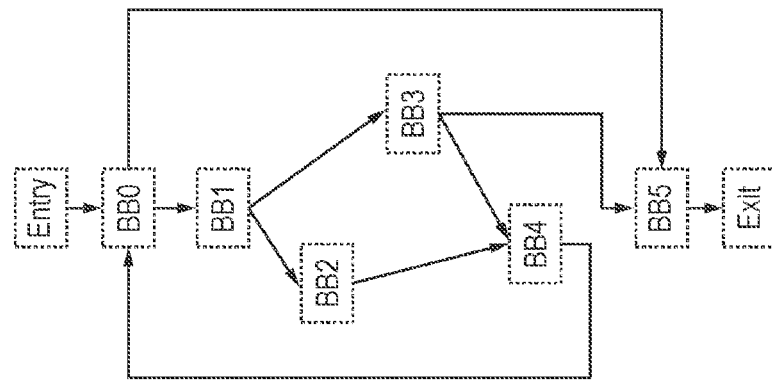
FIG. 3B
```
     ;;
     while() //BB0
     {
         if( ) //BB1
         {
             ... //BB2
         }
         else
         {
             if( ) break;//BB3
         }
         ... //BB4
     }
     ... //BB5
```
FIG. 3A

DETERMINATION OF BRANCH CONVERGENCE IN A SEQUENCE OF PROGRAM INSTRUCTION

TECHNICAL FIELD

The present disclosure relates to the field of data processing. More particularly it relates to the determination of branch convergence in a sequence of program instructions.

BACKGROUND

A set of program instructions for execution by a data-processing apparatus may not only result in execution in a simple, linear manner, i.e. wherein program instructions are executed in sequential order, from a first instruction in a sequence to a last instruction in the sequence. This is because conditions set out in individual program instructions may cause the program flow to take a branch from a given program instruction to another program instruction in the sequence, either skipping forwards in the sequence, or stepping back to a previous program instruction in the sequence. Such possible branching and looping in the execution of a sequence of program instructions may be of particular significance in the context of a data processing apparatus which is capable of executing multiple threads running the same kernel, since performance benefits result from executing such parallel threads in lock-step to make more efficient use of the resources of the data processing apparatus. However, when threads diverge due to different conditions for each thread resulting in those threads taking different branches, such parallelism may be lost. There may however be points at which the separated threads come together again and the opportunity for improved performance through parallel lock-step execution is once more available. The present disclosure relates to the identification of such convergence points.

SUMMARY

At least some embodiments of the present techniques provide a method of compiling a sequence of program instructions to generate a compiled program comprising: identifying basic blocks of program instructions, wherein each basic block has only one entry point and only one exit point; determining at least one execution path which leads to each basic block; when more than one execution path leads to a selected basic block, adding a convergence marker to the compiled program associated with the selected basic block; and when a loop path exists from a further selected basic block to the further selected basic block, adding the convergence marker to the compiled program associated with each exit basic block for the loop path. At least some embodiments of the present techniques provide an apparatus for compiling a sequence of program instructions to generate a compiled program, when the apparatus has a configuration to carry out the above method of compiling a sequence of program instructions.

At least some embodiments of the present techniques provide a computer readable storage medium storing a computer program which when executed on a computer causes the computer to carry out the above method of compiling a sequence of program instructions.

At least some embodiments of the present techniques provide software which when executed on a computer causes the computer to carry out the above method of compiling a sequence of program instructions.

At least some embodiments provide a method of parallel execution of a computer program using multiple execution threads, wherein the computer program comprises a sequence of program instructions, the method comprising: identifying basic blocks of program instructions, wherein each basic block has only one entry point and only one exit point; determining at least one execution path which leads to each basic block; when more than one execution path leads to a selected basic block, adding a convergence marker to the computer program associated with the selected basic block; when a loop path exists from a further selected basic block to the further selected basic block, adding the convergence marker to the computer program associated with each exit basic block for the loop path; and executing the multiple execution threads, wherein executing the multiple execution threads comprises: when a first subset of the multiple execution threads takes a first execution path from a divergent basic block and a second subset of the multiple execution threads takes a second execution path from the divergent basic block, causing the second subset to wait; and when the convergence marker is encountered selecting at least one thread of the multiple execution threads for execution in accordance with predetermined parallel execution rules.

At least some embodiments provide an apparatus for parallel execution of a computer program, wherein the apparatus has a configuration to carry out the above method of parallel execution of a computer program using multiple execution threads.

At least some embodiments of the present techniques provide a computer readable storage medium storing a computer program which when executed on a computer causes the computer to carry out the above method of parallel execution of a computer program using multiple execution threads.

At least some embodiments of the present techniques software which when executed on a computer causes the computer to carry out the above method of parallel execution of a computer program using multiple execution threads.

BRIEF DESCRIPTION OF THE DRAWINGS

The present techniques will be described further, by way of example only, with reference to embodiments thereof as illustrated in the accompanying drawings, in which:

FIG. 3A shows the structure of an example sequence of program instructions;

FIG. 3B shows a Control Flow Graph (CFG) for the sequence of program instructions shown in FIG. 3A;

FIG. 3C shows the CFG of FIG. 3B, with example execution paths for four threads which are executed in parallel;

Figure 1:
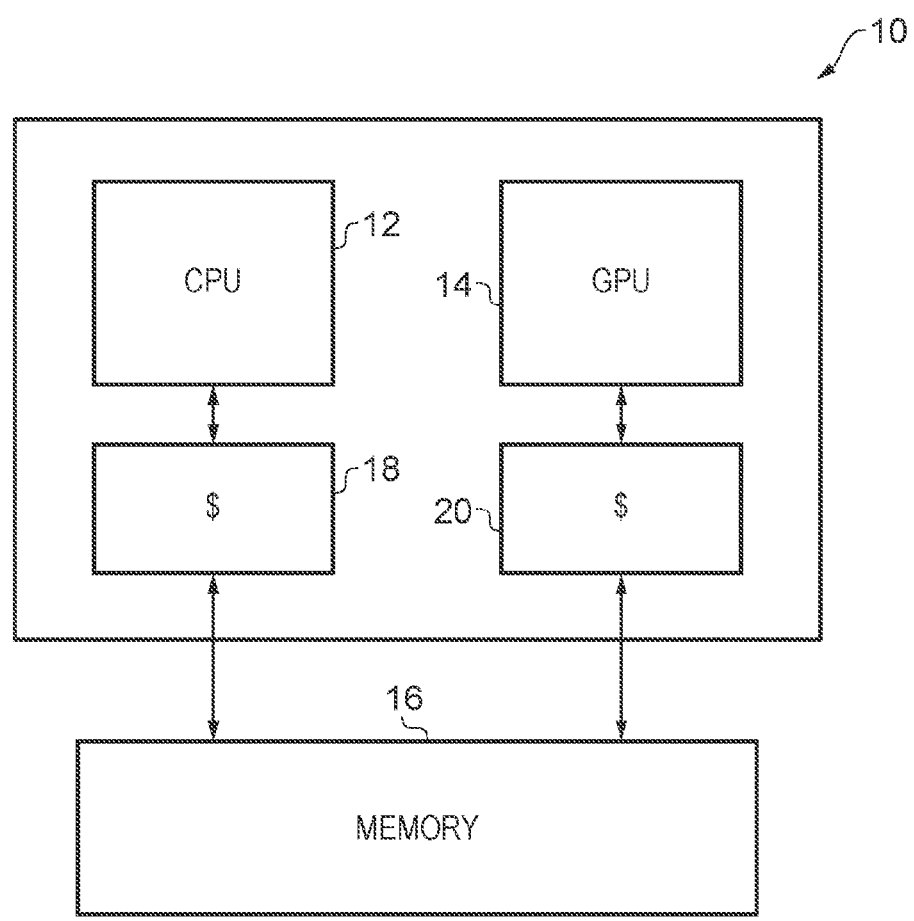
FIG. 1 schematically illustrates an apparatus in one embodiment comprising a CPU and a GPU.

At least some embodiments provide a method of compiling a sequence of program instructions to generate a compiled program comprising: identifying basic blocks of program instructions, wherein each basic block has only one entry point and only one exit point; determining at least one execution path which leads to each basic block; when more than one execution path leads to a selected basic block, adding a convergence marker to the compiled program associated with the selected basic block; and when a loop path exists from a further selected basic block to the further selected basic block, adding the convergence marker to the compiled program associated with each exit basic block for the loop path.

One technique for finding the convergence points in a sequence of program instructions is to use an immediate post-dominator technique whereby basic blocks of program instructions are first identified, i.e. those sets of instructions which do not contain the possibility for branching in that they only have one point of entry and one point of exit, and to represent those basic blocks in a control flow graph. Accordingly a sequence of instructions can be grouped together as a basic block up to an instruction where the opportunity to deviate from sequential instruction execution exists, whereafter a new basic block must begin. A node Z is said to post-dominate a node N in a control flow graph if all paths to the exit node of the graph starting from N must go through Z. The immediate post-dominator of a node N is the post-dominator of N that does not strictly post-dominate any other strict post-dominators of N. The present technique recognises that although such an immediate post-dominator represents a possible convergence point in the control flow graph, in fact the immediate post-dominator approach is one that may omit some convergence points which can result from irregular nesting and control flows, and thus opportunities for efficient parallel execution of multiple threads executing the program instructions may be missed. The present technique addresses this issue by identifying those basic blocks to which more than one execution path leads and adding convergence markers within the control flow at that point. Further, those execution paths which form a loop are identified and convergence markers are added at each basic block along such a loop path where a possible exit from that loop path exists. This technique identifies convergence points which can be missed by the immediate post-dominator technique and thus supports improved parallel execution of multiple threads, where the convergence markers are used in execution to reassess which execution threads should be executed in parallel with one another in order to make efficient use of the resources of the data processing apparatus. It should be noted that the addition of a convergence marker associated with a basic block may be implemented in a number of ways: the marker could be added within the basic block, at a position preceding it, and so on, as long as the apparatus executing the compiled program understands which basic block the marker is associated with.

The above described identification of convergence points in the control flow graph associated with a sequence of program instructions may be provided in a variety of ways, but in some embodiments the determining step comprises: iteratively processing a queue of path items, wherein each path item comprises an indication of at least one basic block, and each iterative step comprises: removing a prior path item from a first position in the queue; and generating a path item comprising the prior path item appended with an indication of a further basic block, wherein an execution path leads from the at least one basic block to the further basic block.

Thus, in order to process the basic blocks of program instructions, i.e. the nodes of the corresponding control flow graph, the present techniques propose the use of a queue of path items, sometimes referred to herein as a priority queue, which is built up from indications of basic blocks. An iterative procedure of processing is proposed wherein, starting from the first entry node of the control flow graph, path items are added to the queue, which path items initially comprise a simple indication of the entry basic block to the control flow graph, and to which are appended indications of further basic blocks within the control flow graph to which an execution path leads from a path item already in the queue. Accordingly, an iterative process is set up wherein path items in the queue are grown by adding indications of basic blocks which form an execution path. Additional path items may be added to the queue when a branch from a basic block leads to more than one basic block, i.e. more than one execution path can be followed from that basic block. At each iteration an existing path item is taken from the priority queue, in particular from a "first position" in the queue, wherein it will be understood that this "first position" could be given by any predefined ordering of the queue, as long as such ordering is maintained, and a new path item is generated based on the path item just removed from the queue by appending that path item with an indication of a basic block to which an execution path leads from that removed path item. This thus enables the queue of path items to be developed, representing each possible execution path through the sequence of program instructions.

In some embodiments the method further comprises: adding the path item to a selected position in the queue such that the path items in the queue are ordered in program counter order with respect to a last basic block in each path item. This thus enables the queue to be prioritised, such that path items representing execution paths through the sequence of program instructions are ordered so that program counter order is respected. This may also correspond to a prioritisation which is used by the apparatus executing the compiled program to select between threads for execution.

The present technique further recognises that the ordering with which such path items are built up in the queue may have significance with regard to identifying convergence points within the compiled program, and in some embodiments when the path item is added other than as a first path item in the ordering, the convergence marker is added to the compiled program associated with the further basic block. Thus, a path item which ends with a basic block which causes it to be placed not in the first position in the ordering of the queue, because another path item in the queue has a basic block which comes earlier in program counter order (for example as determined by reference to the last program instruction in each basic block) then the present technique recognises that the path item being added (not in the first position) represents a potential for convergence since threads following another execution path may have executed in advance of a thread following this execution path, and convergence between these threads may then be possible. Hence, the convergence marker is also associated with this further basic block (i.e. the basic block appended to the path item at this iteration) to enable this possible convergence here to be taken advantage of.

In some embodiments each iterative step comprises: adding a further path item to the queue when a further execution path leads from the at least one basic block to a second further basic block, wherein the further path item comprises the prior path item appended with an indication of the second further basic block. Thus, when more than one execution path leads from the basic block (i.e. to the further basic block and to a second further basic block) the iterative step adds another (further) path item to the queue corresponding to this further execution path. As in the case of the first path item, this further path item then represents a concatenation of basic blocks leading to the basic block under consideration and then to the second further basic block to which this further execution path leads. In other words, where a basic block is encountered by the method when iteratively processing the queue, where that basic block (through branching) has possible execution paths leading to more than one further basic block, a corresponding path item representing an execution path through the sequence of program instructions to each of the possible targets of that branching is then added to the queue.

In some embodiments the method further comprises: when a further prior path item in the queue comprises the indication of the further basic block, modifying the further prior path item to indicate alternative paths to the further basic block; and adding the convergence marker to the compiled program associated with the further basic block. Thus, the iterative procedure of processing the queue may identify another path item already in the queue (a further prior path item) which already represents a possible execution path to the further basic block (i.e. to that basic block to which an execution path is currently being constructed by this iterative step). In other words, the method, at this iterative step, has thus identified two possible execution paths which lead to the same basic block. In this situation, the existing path item in the queue (the further prior path item) is then modified to indicate the alternative paths to the further basic block, and furthermore it is recognised here that this further basic block then represents a convergence point in the control flow graph and the convergence marker is then added to the compiled program in association with this further basic block. As mentioned above the convergence marker may be added to the further basic block itself, or for example to the end of the basic blocks preceding it, or in another position appropriate to the intended execution of this compiled program, such that appropriate reassessment by the execution circuitry of which groups of the multiple execution threads should be executed in parallel with one another at this point can then be carried out.

It may be the case that from a given basic block an execution path is identified which leads to a basic block which is already present in another path item which is already in the queue, in other words a loop may be identified. Thus, in some embodiments when the prior path item comprises the indication of the further basic block the path item is the loop path. Thus, a loop path may be identified by this mechanism within the iterative process and, as mentioned above, the convergence marker can then be added to the compiled program associated with each exit basic block for this loop path.

In such embodiments the identification of exit basic blocks from the loop path may be provided in a number of ways, but in some embodiments the method further comprises, when the prior path item comprises the indication of the further basic block, iteratively processing each basic block in this path item, and at each iterative step, when a path leads from the basic block being processed which exits the loop path, adding the convergence marker to the compiled program associated with the basic block being processed. Exit points from this loop path may thus be efficiently identified and marked with the convergence marker.

As mentioned above, adding the convergence marker to the compiled program may involve adding a convergence marker at a number of different specific positions, depending on the particular requirements of how the convergence marker is to be used by the apparatus which will execute the compiled program, but in some embodiments adding the convergence marker to the compiled program associated with the selected basic block comprises adding the convergence marker immediately preceding the selected basic block. Thus, the apparatus executing the compiled program will then encounter the convergence marker immediately before executing the selected basic block of (compiled) program instructions where convergence has been recognised by the present method as potentially occurring. Thus this represents an expedient point for the executing apparatus to reassess which threads should now be executed in parallel in order to make efficient use of the apparatus resources.

Similarly, in the situation of adding the convergence marker in response to the identification of a loop path (i.e. to the exit points from that loop path) in some embodiments adding the convergence marker to the compiled program associated with each exit basic block for the loop path comprises adding the convergence marker immediately preceding each exit basic block.

At least some embodiments provide an apparatus for compiling a sequence of program instructions to generate a compiled program, wherein the apparatus has a configuration to carry out the method of any of the above described embodiments of that method.

At least some embodiments provide a computer readable storage medium storing a computer program which when executed on a computer causes the computer to carry out the method of any of the above described embodiments of that method. At least some embodiments provide software which when executed on a computer causes the computer to carry out the method of any of above described embodiments of that method.

At least some embodiments provide a method of parallel execution of a computer program using multiple execution threads, wherein the computer program comprises a sequence of program instructions, the method comprising: identifying basic blocks of program instructions, wherein each basic block has only one entry point and only one exit point; determining at least one execution path which leads to each basic block; when more than one execution path leads to a selected basic block, adding a convergence marker to the computer program associated with the selected basic block; when a loop path exists from a further selected basic block to the further selected basic block, adding the convergence marker to the computer program associated with each exit basic block for the loop path; and executing the multiple execution threads, wherein executing the multiple execution threads comprises: when a first subset of the multiple execution threads takes a first execution path from a divergent basic block and a second subset of the multiple execution threads takes a second execution path from the divergent basic block, causing the second subset to wait; and when the convergence marker is encountered selecting at least one thread of the multiple execution threads for execution in accordance with predetermined parallel execution rules.

The execution of the computer program may thus comprise an initial stage of analysis of basic blocks of the program instructions which is carried out in an analogous fashion to that described above with respect to the compilation method, wherein potential convergence points within the program are identified and marked with the convergence marker. Thereafter, when executing multiple execution threads, the method comprises identifying divergent basic blocks where more than one execution path leads from that basic block, and at this point identifying subsets of the multiple execution threads which take those paths, and causing at least one subset to wait, whilst another continues execution, since where these subsets of execution threads have taken different paths, the benefits of parallel execution of both subsets do not occur and it may be more efficient to allow these subsets to be executed in a serial, rather than parallel, manner. Following this, when the convergence marker added to the computer program is then encountered, predetermined parallel execution rules which define when it is appropriate (in terms of efficient use of the execution apparatus resources) to execute selected multiple execution threads in parallel can then be used to determine which of the threads of the multiple execution threads should now be executed in parallel with one another (until another divergent basic block is encountered).

In some embodiments selecting the at least one thread of the multiple execution threads for execution in accordance with the predetermined parallel execution rules comprises selecting a group of threads for which a next instruction to be executed is earliest in program counter order. This prioritisation of a group of threads on the basis of program counter order may then correspond to the manner in which path items were ordered and processed in the queue when the above described queue of the compilation method of the present techniques was employed.

At least some embodiments provide an apparatus for parallel execution of a computer program, wherein the apparatus has a configuration to carry out any of the above mentioned methods of parallel execution of a computer program using multiple execution threads.

This execution apparatus may take a variety of forms, but in some embodiments the apparatus is a graphics processing unit. Graphics processing units may be required to execute a great number of execution threads in parallel, and be able to derive processing efficiency from such parallelization, and the present techniques support efficient use of such an apparatus, in regard to supporting selection of the points in the execution process when the identification (and re-identification) of which threads should be executed in parallel with one another is to be carried out. This is notable because this assessment and re-assessment of which threads to operate in parallel itself represents a non-trivial processing task for the execution apparatus and if carried out too frequently can reduce the processing efficiency, yet if carried out too infrequently, such parallelization benefits as may be available may not be fully taken advantage of. The present techniques allow a useful balance to be struck between these positions.

At least some embodiments provide a computer readable storage medium storing a computer program which when executed on a computer causes the computer to carry out the above mentioned embodiments of the method of parallel execution of a computer program using multiple execution threads.

At least some embodiments provide software which when executed on a computer causes the computer to carry out any of the above described embodiments of the method of parallel execution of a computer program using multiple execution threads.

Some particular embodiments will now be described with reference to the Figures.

FIG. 1 schematically illustrates a data processing apparatus 10 in one embodiment. The data processing apparatus 10 comprises a central processing unit (CPU) 12 and a graphics processing unit (GPU) 14. Each of the CPU 12 and GPU 14 can perform data processing operations, which are carried out by retrieving data processing instructions and data to be processed from the memory 16 and, where appropriate, writing modified data back to the memory 16. Each of the CPU 12 and GPU 14 are provided with a respective cache 18, 20 in order to reduce the latency associated with the retrieval of instructions or data from the memory 16. It will be appreciated that both the CPU 12 and GPU 14 may perform a great variety of data processing operations, but of particular relevance to the discussion of the present techniques are the ability of the GPU 14 to perform parallel execution of a computer program using multiple execution threads and the ability of the CPU 12 to compile that computer program from a source program stored in the memory 16 into a executable program also stored in the memory 16 which the GPU 14 can retrieve and then execute in this parallelized manner. Further, a particular feature of the CPU 12 and GPU 14 shown in FIG. 1 is the ability of the CPU 12 to add "convergence markers" to the computer program which it compiles, these being indicative of points at which the CPU has determined that it may be beneficial for the GPU 14 to check for convergence between the multiple execution threads which it executes when executing the program compiled by the CPU 12. As mentioned above, more efficient usage of the resources of the data processing apparatus may be gained by the GPU 14 when carrying out parallel execution of the program using multiple execution threads by selecting an appropriate subset of those multiple execution threads for parallel execution at any given point in time. However, since the determination of this subset itself also consumes processing resources of the data processing system, such efficiency may be lost if this determination is performed too frequently. As mentioned above, the present techniques address this issue by the selection of points within a compiled computer program at which convergence markers should be added (for example by the CPU 12 in the example of FIG. 1). Finally, note that there is no requirement for the CPU 12 and GPU 14 to form part of the same data processing apparatus, and the data processing system 10 which comprises both the CPU 12 and the GPU 14 is merely one example. In other embodiments the CPU and GPU could respectively form part of entirely separate data processing apparatuses. Indeed, the present techniques are related to the compilation and execution of computer programs and are equally applicable to data processing apparatuses which do not have the specialised processing units such as the CPU 12 and GPU 14 of the embodiment of FIG. 1.

Figure 2:
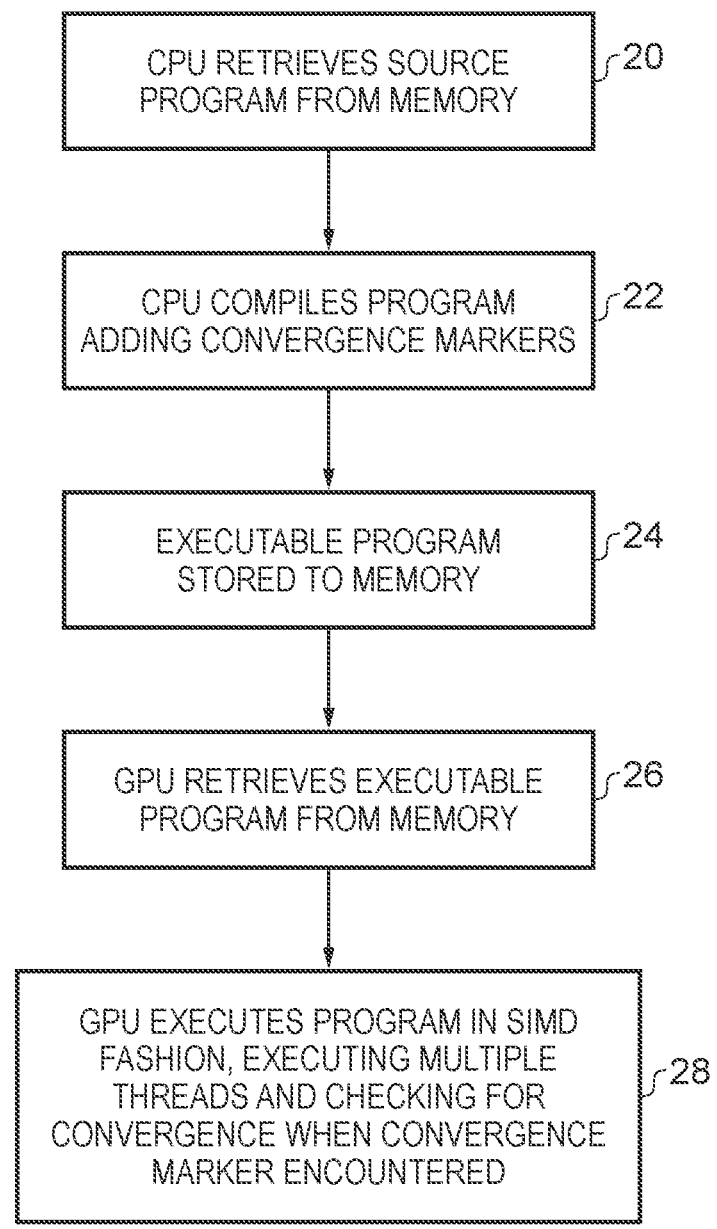
FIG. 2 is a flow diagram showing a sequence of steps carried out in one embodiment when a CPU is used to compile a source program for execution by a GPU in a parallel execution manner.

FIG. 2 shows a sequence of steps which may be carried out by a data processing system such as that illustrated in FIG. 1, in which a CPU compiles a source program for execution by a GPU. At step 20 the CPU retrieves the source program from memory and at step 22 compiles this source program adding convergence markers at identified appropriate points within that program (as will be discussed in more detail with reference to the figures which follow). The thus-compiled executable program is then stored by the CPU back into the memory at step 24. Then, at step 26, the GPU retrieves this executable program from the memory and at step 28 executes the program in a single instruction multiple data (SIMD) fashion, executing multiple threads in parallel. For example, in the context of a GPU executing such an executable program, this SIMD execution may correspond to a sequence of program instructions being applied to multiple pixels of a graphics display, with data corresponding to each pixel position being processed by the same sequence of instructions. The convergence markers added to the executable program at step 22 by the CPU during the compilation process are then encountered (at step 28) by the GPU when executing this program, and when such a convergence marker is encountered by the GPU it checks for convergence between the multiple execution threads which it is currently executing, i.e. it reassesses which of the currently defined threads should be actively executed in parallel with one another in order to make efficient usage of the resources of the data processing system.

FIG. 3A shows an example sequence of program instructions, used here to support the discussion of the present techniques. It will be appreciated that only the control flow instructions in the example program code of FIG. 3A are shown, since these are the instructions of relevance to the application of the present techniques, and the data processing instructions which would make up the remainder of a "full" program have been omitted (for clarity of illustration only). FIG. 3B shows the control flow graph (CFG) corresponding to the program instructions of FIG. 3A. It will be recognised that several different execution paths are possible through the CFG of FIG. 3B, corresponding to the possible paths shown from the first explicitly represented program instruction (BB0) in at FIG. 3A to the exit from the final program instruction of FIG. 3A (BB5). FIG. 3C shows the particular execution paths taken by four example threads (T0, T1, T2, T3). All four threads are part of the same kernel (executing the sequence of instructions shown in FIG. 3A) and execute in parallel (SIMD) to begin with. Accordingly, as shown in FIG. 3C, all four threads follow the execution path from BB0 to BB1. Then, at BB1, threads T0 and T1 separate from threads T2 and T3, due to a different outcome of the "if" condition tested at BB1. Due to the different execution paths taken by the threads T0, T1 and T2, T3 the hardware of the apparatus executing these threads (e.g. the GPU 14 of FIG. 1) selects threads T0, T1 for further execution and places threads T2, T3 in a waiting state for later further execution. Execution of threads T0, T1 continues with execution of the program instructions represented by BB2. If a convergence marker has been added to the compiled program at BB2 (see step 22 of FIG. 2) then the hardware of the GPU can perform its convergence checks at this point, to determine which threads should now be progressed further in the process of execution. This being the case (i.e. that the convergence marker was set at BB2), the waiting threads, T2, T3 are then selected for further execution, whilst T0, T1 wait, because BB3 precedes BB4 in program count order. Note that it is not essential for execution of multiple threads to be prioritised in terms of the program counter values of the instructions being executed, but this represents one manner (used here) of prioritising between multiple execution threads which may be selected. Once the execution of BB3 has completed, a convergence marker may then cause the apparatus once again to determine which subset of the multiple execution threads should then be selected for execution, and in the example of FIG. 3C, where thread T2 follows the execution path from BB3 to BB4, whilst thread T3 follows the execution path from BB3 to BB5, the apparatus can select T0, T1 and T2 as a subset of the multiple execution threads to be executed in parallel next, namely by the execution for each thread of the instructions represented by BB4. In the meantime, thread T3 waits. Thus, it will be appreciated from the above discussion of FIGS. 3A-C that the selection of the points in the compiled program at which the compiler adds the convergence markers represents both an opportunity for efficient usage of the execution apparatus resources, by combining threads for parallel execution where those threads are executing the same basic blocks of program instructions, yet itself also represents a processing burden on the execution apparatus, due to the convergence checks which the execution apparatus must carry out in order to correctly determine such a subset of threads to be executed in parallel.

Figures 4A, 4B:
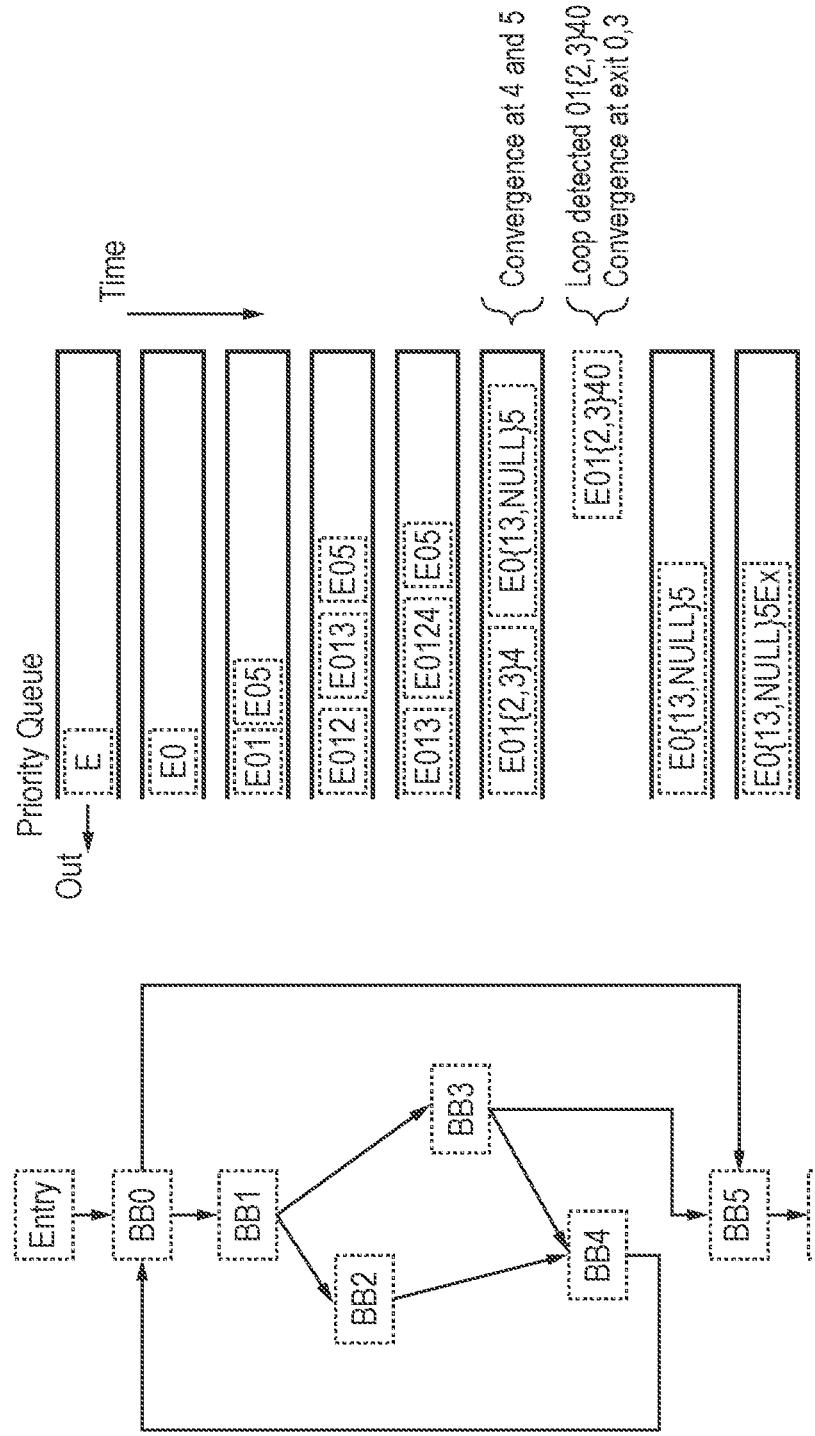
FIG. 4A shows the CFG of FIG. 3B.
FIG. 4B shows the evolution of a priority queue used when determining convergence points in the sequence of program instructions of FIG. 3A in one embodiment.

The present techniques address this issue as is discussed now with reference to FIGS. 4A and 4B. FIG. 4A reproduces the control flow graph of FIG. 3B, whilst FIG. 4B shows the application of present techniques to the analysis of the control flow graph of FIG. 4A through the use of a priority queue by the compiler in one embodiment. The priority queue is populated by "path items", each of which represents a sequence of basic blocks starting from the entry node (E) to a basic block currently waiting for execution. Items stored in the priority queue are stored in the order of the relative placement in memory of the basic blocks. Initially, the priority queue is populated by just one item, representing the entry node E. At each of the steps (levels) shown in the time evolution of FIG. 4B, an existing path item in the priority queue is removed and the execution path is extended by suffixing a successor basic block to the existing path. For example, from the first to the second stage shown in FIG. 4B (proceeding from top to bottom) the path item E is removed and replaced with a path item E0, representing the execution path from the entry node to the basic block BB0. This path item E0 is then removed at the next iteration and since basic block BB0 has two successor basic blocks (BB1 and BB5) two path items are created for addition to the priority queue, both having the same E0 stem and the first appended with "1" to represent the execution path to BB1, and the second appended with "5" to represent the execution path to BB5. Note also that because BB1 is at a lower program counter value than BB5, E01 is placed ahead of E05 in the priority queue. This prioritisation (in terms of program counter order) of path items as they are added to the priority queue also means that when E012 is removed and then appended with 4, the resulting path item E0124 is placed after E013 in the priority queue, since basic block BB3 precedes basic block BB4 in program counter order.

A further point to note with respect to the processing of the priority queue shown in FIG. 4B is the extension of the path item E013 to represent the execution path leading to BB4. When E013 is removed from the priority queue and should be appended with "4" to represent the extension of the execution path from BB3 to BB4, the existence of another execution path leading to BB4 is identified by the pre-existence of the path item E0124 in the priority queue. As a result, the existing path item E0124 and the proposed path item E0134 are combined to give a combined path E01{2,3}4 which is then added to the priority queue. Since the analysis of this step has explicitly recognised the convergence of two separate execution paths into one basic block (at BB4), the convergence marker is then added at this point. Note that the particular placement of the convergence marker within the program could vary, as long as it is recognised to be associated with the convergence of the execution paths at BB4. For example, the convergence marker could be placed as a new first program instruction within the basic block B4, or for example could be placed at the end of each of the basic blocks BB2 and BB3, as long as the effect on the execution apparatus is that the convergence analysis is carried out before the execution of threads at BB4, in order to take advantage of the possible addition to the number of threads which can be executed in parallel at BB4. Similarly, note that when E013 is removed from the priority queue and should be appended with "5" in order to represent the execution path from BB3 to BB5, the existing path leading to BB5 in the priority queue i.e. E05 is identified and thus a combined path is also formed here, represented in FIG. 4B by E0{13, NULL}5 representing these two possible paths.

Furthermore, an execution path from BB4 leads to BB0 and hence when the path item E01 {2,3}4 is extended with "0" in order to represent this, this execution path is identified as a loop in that a possible execution path leads from BB0 back to BB0. In consequence, this path item is not added back into the priority queue, and furthermore possible exits from this loop (in this example from BB0 and from BB3) are identified by iteratively proceeding around the loop, determining if each basic block thus encountered gives the possibility of exiting the loop. The corresponding "loop exit" basic blocks thus found are marked with the convergence marker. The processing of the priority queue continues until it is empty, which in the example of FIGS. 4A and 4B corresponds to the removal of the path item which has been built up representing the possible paths leading to BB5 and then to the exit node.

Figure 5:
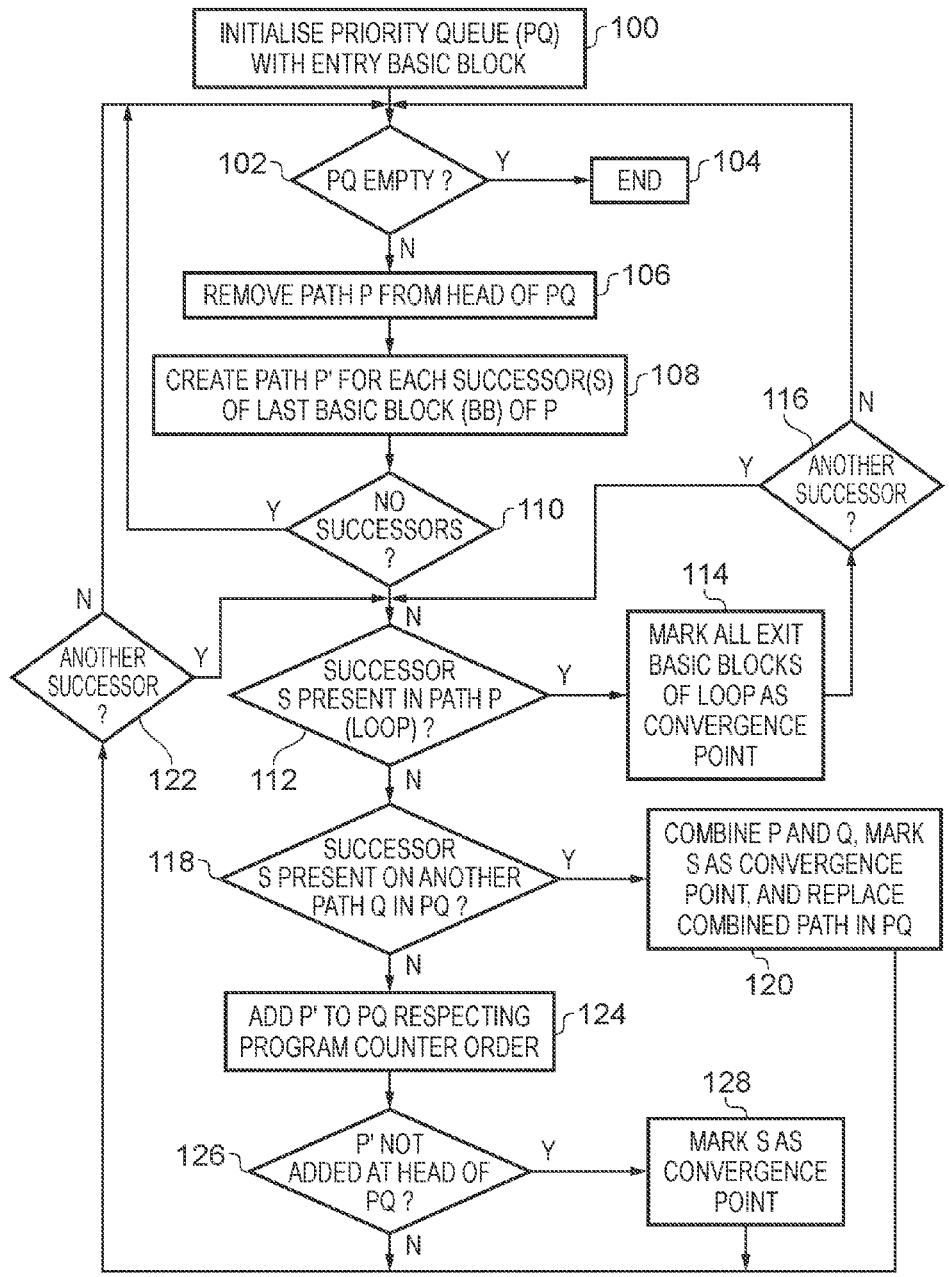
FIG. 5 shows a sequence of steps which are taken in the method of one embodiment when using a priority queue to determine convergence points in a sequence of program instructions.

FIG. 5 shows a sequence of steps which are taken in one embodiment when carrying out the above described method of adding convergence markers during a compilation procedure. The flow begins at step 100 where the priority queue is initialised with an entry basic block (E). Then, at step 102 it is determined if the priority queue is empty. Of course at the first iteration immediately following step 100 this cannot be the case, but when this is the case (to be discussed in more detail below) the flow precedes to step 104, where the steps end. However, when the priority queue is not empty then the flow proceeds to step 106, where a path P (also referred to herein as a "path item") is removed from the head of the priority queue. Then, following this, at step 108 a path P' for each successor or successors of the last basic block (BB) of P is created. If there are no successors to P, then the flow (see step 110) returns to step 102. When such a successor or successors are present, then the flow proceeds to step 112, where it is determined if this successor (or the successor presently being considered in the case of multiple successors) is already present in the path P, meaning that a loop has been identified. If this is the case the flow proceeds to step 114 where all exit basic blocks of this loop are marked as a convergence point (i.e. the convergence marker is added in association with each of these basic blocks). As mentioned above, these "loop exit" are identified by iteratively proceeding around the loop, determining if each basic block thus encountered gives the possibility of exiting the loop. Then from step 116, if there is another successor to P, the flow returns to step 112. When there are no further successors, the flow returns from step 116 to step 112.

If a loop is not identified at step 112, then the flow proceeds to step 118, where it is determined if the successor S under consideration is already present on another path Q in the priority queue. If this is the case then the flow proceeds to step 120, where paths P and Q are combined, the successor basic block S is marked as a convergence point and the combined path is replaced in the priority queue. The flow then proceeds to step 122, where it is determined if there is another successor of the path P to be considered. If there is, the flow returns to step 112, whereas if there is not the flow returns to step 102. Returning to a consideration of step 118, if the successor basic block S currently under consideration is not present on another path Q already present in the priority queue then the flow proceeds to step 124, where P' is added to the priority queue respecting program counter order, i.e. such that the path items present in the priority queue are ordered such that the program counter value associated with the last basic block in that path item (for example associated with the last instruction in that last basic block) determines its position in the queue. The flow then proceeds to step 126 where it is determined if P' has not been added to the head of the priority queue. This being the case, the flow proceeds via step 128, where the basic block S is marked as a convergence point (i.e. the convergence marker is added to the program in association with this basic block). The flow then proceeds to step 122, where (as described above) it is determined if there is another successor basic block to be considered for the path P'. As before, when this is not the case, the flow proceeds to step 102 and when this is the case the flow proceeds to step 112. Accordingly, by following the steps set out in FIG. 5, starting from a path item in the priority queue corresponding to an entry basic block and removing path items from the priority queue and suffixing them with further basic blocks to represent execution paths through the program, and under some circumstances adding path items back to the priority queue, a process is followed by which the priority queue is built up and then emptied and when finally the priority queue is empty, the procedure completes at step 104.

Figure 6:
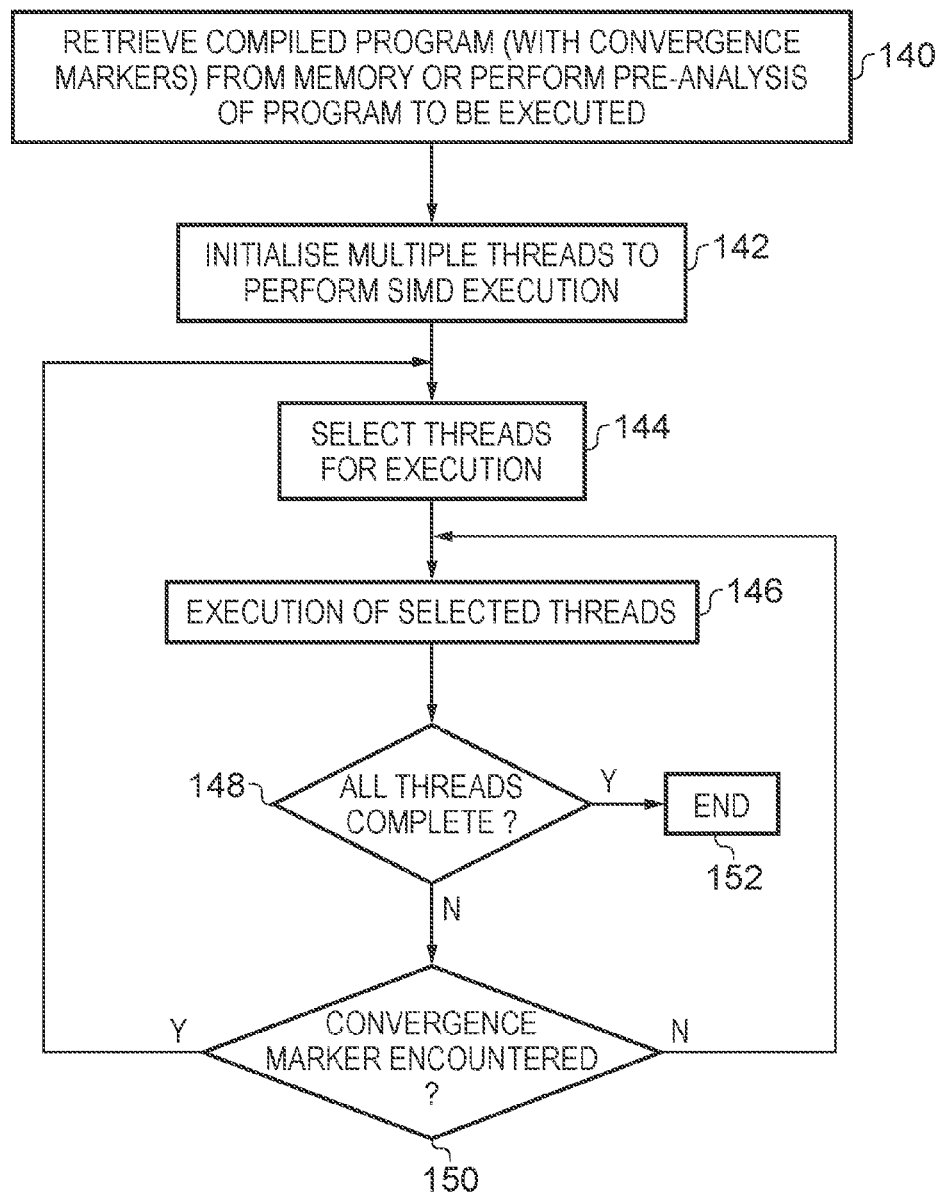
FIG. 6 shows a sequence of steps which are taken in one embodiment when executing a compiled program to which convergence markers have been added at the compilation stage in one embodiment.

FIG. 6 shows a sequence of steps which are taken in one embodiment when executing a computer program compiled using the present techniques to add convergence markers, or when executing a program and also performing an initial step of analysis (and adding convergence markers). Firstly, at step 140, the apparatus which is to execute the computer program (e.g. the GPU 14 of FIG. 1) retrieves the compiled executable (with its embedded convergence markers from memory) or retrieves a program to be executed an performs a pre-analysis (such as in accordance with the steps of FIG. 5) in order to add convergence markers where appropriate. Then, at step 142 multiple threads are initialised in order to perform SIMD execution of this program, corresponding to the multiple data items to which the executable should be applied. Then at step 114 the apparatus selects one or more of these threads for parallel execution. This in particular involves determining from all the threads which could be executed which subset thereof represents a group of threads which may be executed in lock-step with one another in order to take advantage of the resource usage efficiency which results from such parallelism. Execution of the subset of threads thus selected then begins at step 146, and it should be noted that this execution may also involve some executing threads being put on hold when for example a branch is encountered and the apparatus selects only a subset of the currently executing threads for further execution (for the time being). At step 148 it is determined if the execution of all possible threads is now complete. Whilst this is not the case when the flow proceeds to step 150 where it is determined if a convergence marker added during the compilation process has been encountered by at least one of the executing threads. Whilst this is not the case, the flow returns to step 146 for further execution of these selected threads to continue. Otherwise, if the convergence marker is encountered, then the flow proceeds back to step 144 for a new assessment of the subset of threads which now should be executed in parallel to be carried out. Once all threads have completed (see step 148) then the flow ends at step 152 (i.e. execution of this compiled executable is complete.

Figure 7:
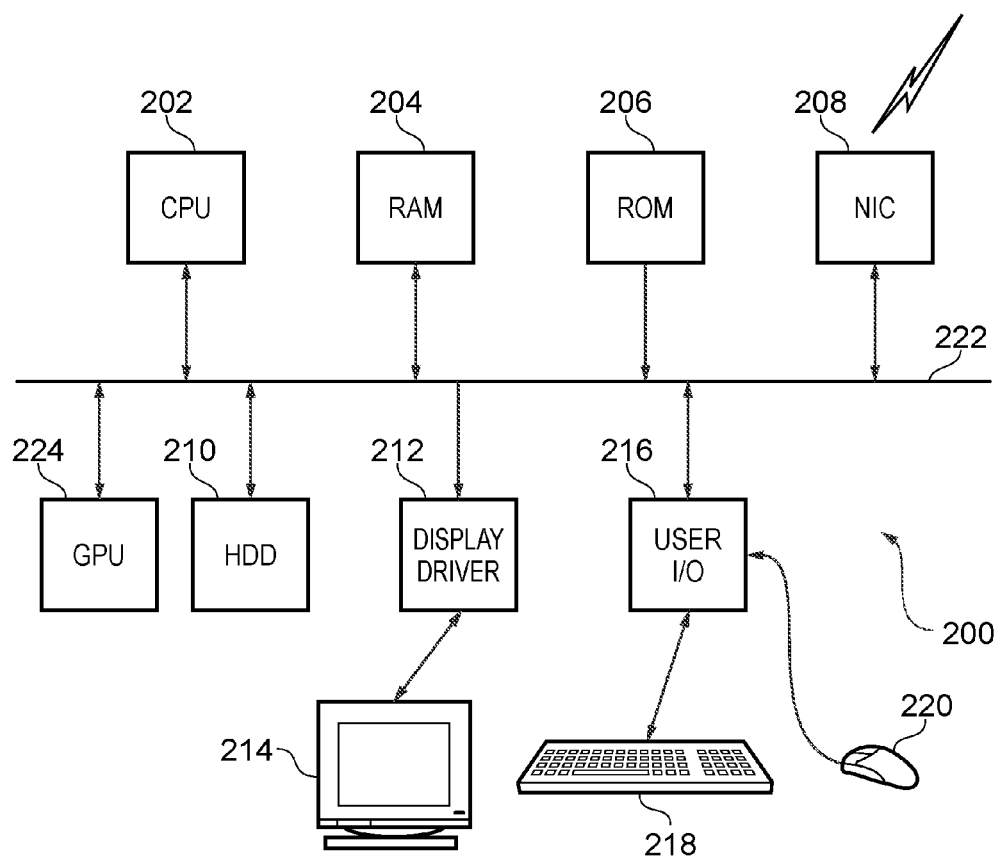
FIG. 7 schematically illustrates a general purpose computing device which supports both compilation and execution in one embodiment.

FIG. 7 schematically illustrates a general purpose computing device 200 of the type that may be used to implement the above described techniques. The general purpose computing device 200 includes a central processing unit 202, a random access memory 204 and a read only memory 206, connected together via bus 222. It also further comprises a network interface card 208, a hard disk drive 210, a display driver 212 and monitor 214 and a user input/output circuit 216 with a keyboard 218 and mouse 220 all connected via the common bus 222. It further comprises a graphics processing unit 224 also connected to the common bus 222. In operation, such as when carrying out the above described compilation process, the central processing unit 202 will execute computer program instructions that may for example be stored in the random access memory 204 and/or the read only memory 206. Program instructions could instead or additionally be retrieved from the hard disk drive 210 or dynamically downloaded via the network interface card 208. The result of these operations by the central processing unit 202, for example in the form of a compiled computer program ready for execution, may be stored locally in the RAM 204 or the HDD 210, or could be transmitted to a remote location via the NIC 208. Such a compiled computer program could then be executed by the GPU 224, having retrieved it from the location at which it was stored by the CPU 202. The results of the processing performed by the CPU 202 and the GPU 224 may be displayed to a user via a connected display driver 212 and monitor 214. User inputs for controlling the operation of the general purpose computing device 200 may be received via a connected user input output circuit 216 from the keyboard 218 or the mouse 220.

It will be appreciated that the computer programs executed by the general purpose computing device 200, and in particular by either the CPU 202 or the GPU 224 could be written in a variety of different computer languages. The computer programs may be stored locally on a recording medium or dynamically downloaded to the general purpose computing device 200. When operating under control of an appropriate computer program, the general purpose computing device 200 can perform the above described techniques of compilation and/or program execution and can be considered to form an apparatus for performing the above described techniques of compilation and/or program execution. The architecture of the general purpose computing device 200 could vary considerably and FIG. 7 is only one example.

In the present application, the words "configured to . . . " or "arranged to" are used to mean that an element of an apparatus has a configuration able to carry out the defined operation. In this context, a "configuration" means an arrangement or manner of interconnection of hardware or software. For example, the apparatus may have dedicated hardware which provides the defined operation, or a processor or other processing device may be programmed to perform the function. "Configured to" or "arranged to" does not imply that the apparatus element needs to be changed in any way in order to provide the defined operation.

Although illustrative embodiments have been described in detail herein with reference to the accompanying drawings, it is to be understood that the invention is not limited to those precise embodiments, and that various changes, additions and modifications can be effected therein by one skilled in the art without departing from the scope and spirit of the invention as defined by the appended claims. For example, various combinations of the features of the dependent claims could be made with the features of the independent claims without departing from the scope of the present invention.

We claim:

1. A method of parallel execution of a computer program using multiple execution threads, wherein the computer program comprises a sequence of program instructions, the method comprising:
identifying basic blocks of program instructions, wherein each basic block has only one entry point and only one exit point;
determining at least one execution path which leads to each basic block;
when more than one execution path leads to a selected basic block, adding a convergence marker to the computer program associated with the selected basic block;
when a loop path exists from a further selected basic block to the further selected basic block, adding the convergence marker to the computer program associated with each exit basic block for the loop path; and
executing the multiple execution threads, wherein executing the multiple execution threads comprises:
when a first subset of the multiple execution threads takes a first execution path from a divergent basic block and a second subset of the multiple execution threads takes a second execution path from the divergent basic block, causing the second subset to wait; and
when the convergence marker is encountered selecting at least one thread of the multiple execution threads for execution in accordance with predetermined parallel execution rules.

2. The method as claimed in claim 1, wherein selecting the at least one thread of the multiple execution threads for execution in accordance with the predetermined parallel execution rules comprises selecting a group of threads for which a next instruction to be executed is earliest in program counter order.

3. Apparatus for parallel execution of a computer program, wherein the apparatus has a configuration to carry out the method of claim 1.

4. The apparatus as defined in claim 3, wherein the apparatus is a graphics processing unit.

5. A computer readable storage medium storing in a non-transient fashion a computer program which when executed on a computer causes the computer to carry out the method of claim 1.

* * * * *